(12) United States Patent
Sherman

(10) Patent No.: US 6,489,036 B1
(45) Date of Patent: Dec. 3, 2002

(54) CERAMIC/METAL LAMINATE FOR THERMAL SHOCK INVOLVING APPLICATIONS

(75) Inventor: Dov Sherman, Pardesia (IL)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

(21) Appl. No.: 09/700,762
(22) PCT Filed: May 27, 1999
(86) PCT No.: PCT/IL99/00280
§ 371 (c)(1),
(2), (4) Date: Nov. 20, 2000
(87) PCT Pub. No.: WO99/62706
PCT Pub. Date: Dec. 9, 1999

Related U.S. Application Data
(60) Provisional application No. 60/087,341, filed on May 29, 1998.

(51) Int. Cl.[7] ................................................ B32B 15/04
(52) U.S. Cl. ........................ 428/469; 428/697; 428/701; 428/702; 428/704
(58) Field of Search .................................. 428/216, 469, 428/472, 697, 698, 699, 701, 702, 704

(56) References Cited

U.S. PATENT DOCUMENTS

| | | | | |
|---|---|---|---|---|
| 4,643,951 A | * | 2/1987 | Keem et al. ................. | 428/469 |
| 5,059,582 A | * | 10/1991 | Chung ............................ | 505/1 |
| 5,350,637 A | * | 9/1994 | Ketcham et al. .......... | 428/539.5 |
| 5,503,912 A | * | 4/1996 | Setoyama et al. ........... | 428/216 |
| 5,543,187 A | * | 8/1996 | Errico et al. ................. | 428/332 |
| 5,652,044 A | * | 7/1997 | Rickerby ..................... | 428/216 |

* cited by examiner

Primary Examiner—Deborah Jones
Assistant Examiner—G. A. Blackwell-Rudasill
(74) Attorney, Agent, or Firm—G. E. Ehrlich Ltd.

(57) ABSTRACT

A laminate article of manufacture comprising a plurality of ceramic layers interposed by at least one metallic interlayer and which possess superior resistivity to thermal shock induced crack formation.

33 Claims, 13 Drawing Sheets

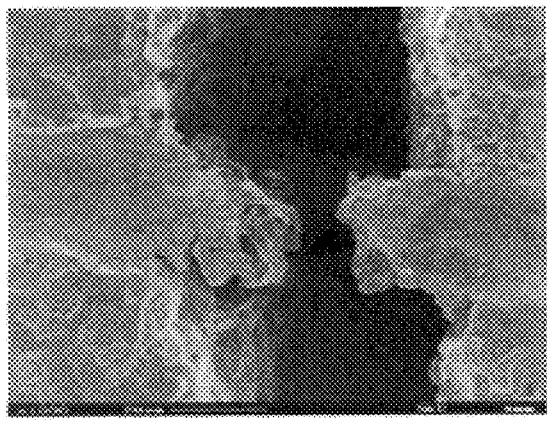 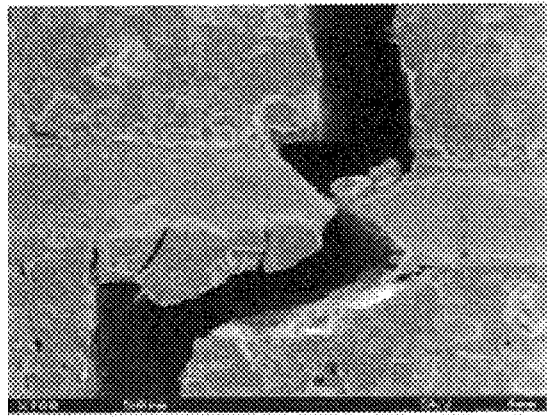
Fig. 8a                Fig. 8b
 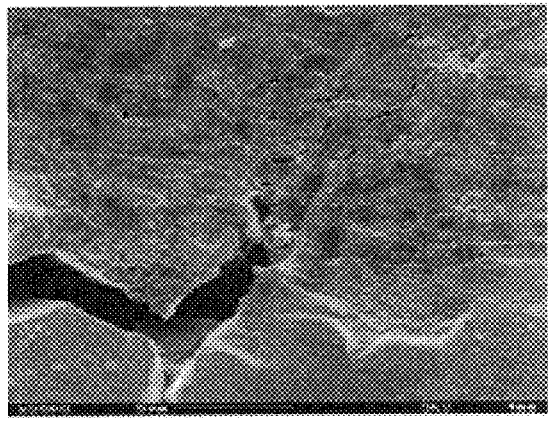
Fig. 8c                Fig. 8d

CERAMIC/METAL LAMINATE FOR THERMAL SHOCK INVOLVING APPLICATIONS

This application is a 371 of PCT/IL99/00280 filed May 27, 1999 Prov. Appl. 60/087,341 filed May 29, 1998.

FIELD AND BACKGROUND OF THE INVENTION

The present invention relates to ceramic articles and, more particularly, to laminate ceramic stand-alone articles or coatings having novel material architecture, properties and uses. Most particularly, the present invention relates to ceramic/metal laminates having superior thermal shock induced crack formation resistance.

When monolithic ceramics are subjected to high heat transfer or rapid changes in temperature, damage in the form of cracks occurs due to high tensile stresses, inherent low fracture toughness, and the presence of processing flaws [1–4].

Quantitatively, thermal shock behavior is characterized by several material parameters. One group is combined into the thermal stress resistance parameter, R, in centigrade, expressed in terms of the ultimate tensile stress, $\sigma_{cr}$, the biaxial elastic modulus, $E'=E/(1-v)$, and the thermal expansion coefficient, $\alpha$:

$$R=\sigma_{cr}/E\alpha \qquad (1)$$

R is the lower bound for the maximum difference in temperature that a ceramic can withstand without cracking. Another parameter, known as the Biot modulus, $\beta$, reflects the severity of the thermal shock conditions:

$$\beta=th/k \qquad (2)$$

where t is the length scale (most often the thickness), h the surface heat transfer, and k the thermal conductivity [5].

Quenching in water generates severe conditions for thermal shock due to a phase transformation from water to vapor, hence the heat transfer is high. On the other hand, water quench presents some difficulties, which arise from the non-uniform heat transfer, which is a strong function of the local temperature [6]. The critical temperature, $\Delta T_C$, is usually defined [4] as the temperature difference between the maximum temperature of the specimen (or even the furnace temperature) and the temperature of the quenched media prior to cracking. This critical temperature as a function of specimen thickness for several ceramics quenched in water was determined experimentally [4], and demonstrated increased critical thermal difference as the specimen's thickness reduced. The severity of quenching in room temperature water compared with cooling in boiling water or other hot liquids was shown [4, 7].

While some materials, such as ordinary glass, can take a temperature shock of only 80° C. before cracks initiate, others, like Silicon Nitride [4] can withstand sudden changes of more than 600° C. Therefore, monolithic ceramics are not sufficiently strong to serve at high temperatures and in harsh environments when thermal shock must be taken into account [8].

It is well known that layered structure shells, such as nacre, are much s tougher than polycrystalline calcite [9, 10]. Recent work has shown that layered ceramic structures can absorb much higher mechanical energies even when individual ceramic layers experienced massive cracking at room [11, 12] and high temperatures [13]. A cost-effective way of making toughened ceramic laminate for use at high temperatures under bending was presented [14, 15]. A similar constitution, but with stronger interfaces, has been suggested lately [16]. Work by Marshall et al. [17] on alumina interlayers separating ceria doped zirconia shows that the presence of the interlayers prevents the spread of the damage zone ahead of the crack tip, while at the same time causing the transformation zone to spread laterally. This effect permits a considerable increase in the work that is absorbed by that zone.

One of the most efficient ways of absorbing energy is by plastic deformation of the material. Metal-ceramic laminates have been studied extensively [18–21] in this context. Such materials exhibit many attractive properties, but the relatively poor oxidation resistance of the metals, compared with that of ceramics, makes such materials unsuitable; for use at high temperatures.

There is thus a widely recognized need for, and it would be highly advantageous to have, ceramic material having an architecture devoid of the above limitations and which can withstand higher thermal shocks and which can therefore better suited for implementation in thermal shock involving applications.

SUMMARY OF THE INVENTION

A new material architecture with a view to increase the maximum difference in temperature that ceramics can withstand and still maintain structural integrity and strength is described herein. The new architecture is of ceramic layers alternating with metallic interlayers. In this system, the ceramic is the high melting point constituent, possessing high stiffness, high wear and fatigue resistance, and able to maintain these properties in a corrosive environment and at elevated temperatures. The metal interlayers provide the needed compliance, ductility, and toughness. The interface should be strong enough to prevent crack deflection and disintegration of the material.

Thus, according to one aspect of the present invention there is provided a laminate article of manufacture comprising a plurality of ceramic layers interposed by at least one metallic interlayer, such that a ductile behavior with energy dissipating feature is obtained.

According to yet another aspect of the present invention there is provided a laminate article of manufacture comprising a plurality of ceramic layers interposed by at least one metallic interlayer, such that a driving force in the laminate article is at least twice as much as compared with a similar monolithic ceramic article.

According to still another aspect of the present invention there is provided a laminate article of manufacture comprising a plurality of ceramic layers interposed by at least one metallic interlayer, such that a crack arrest mechanism is formed at ceramic-metal interfaces, thereby reducing crack formation when exposed to thermal shock, as compared to a similar monolithic ceramic article.

According to an additional aspect of the present invention there is provided a laminate article of manufacture comprising a plurality of ceramic layers interposed by at least one metallic interlayer, such that substantially no interaction between cracking mechanisms developing in one ceramic layer with those in adjacent ceramic layers are evident upon thermal shock.

According to yet an additional aspect of the present invention there is provided a laminate article of manufacture comprising a plurality of ceramic layers interposed by at least one metallic interlayer, such that a cracking mechanism in each ceramic layer is substantially an independent event associated with a maximum tensile stresses in that layer.

According to still an additional aspect of the present invention there is provided a laminate article of manufacture comprising a plurality of ceramic layers interposed by at least one metallic interlayer, such that a residual load to fracture of the laminated article following a thermal shock is at least two fold higher as compared to a similar monolithic ceramic article.

According to a further aspect of the present invention there is provided an article of manufacture comprising a bulk ceramic body being coated with a coat including a plurality of ceramic layers interposed by at least one metallic interlayer, such that such that a ductile behavior with energy, dissipating feature is obtained for the coat.

According to yet a farther aspect of the present invention there is provided an article of manufacture comprising a bulk ceramic body being coated with a coat including a plurality of ceramic layers interposed by at least one metallic interlayer, such that a crack arrest mechanism is formed at ceramic-metal interfaces, thereby reducing crack formation in the article when exposed to thermal shock, as compared to a similar monolithic ceramic article.

According to still a further aspect of the present invention there is provided an article of manufacture comprising a bulk ceramic body being coated with a coat including a plurality of ceramic layers interposed by at least one metallic interlayer, such that substantially no interaction between cracking mechanisms developing in one ceramic layer with those in adjacent ceramic layers are evident upon thermal shock.

According to an additional aspect of the present invention there is provided an article of manufacture comprising a bulk ceramic body being coated with a coat including a plurality of ceramic layers interposed by at least one metallic interlayer, such that a cracking mechanism in each ceramic layer is substantially an independent event associated with a maximum tensile stresses in that layer.

According to yet an additional aspect of the present invention there is provided an article of manufacture comprising a bulk ceramic body being coated with a coat including a plurality of ceramic layers interposed by at least one metallic interlayer, such that a residual load to fracture of the article following a thermal shock is at least two fold higher as compared to a similar monolithic ceramic article.

According to further features in preferred embodiments of the invention described below, the ceramic body (where applicable) and each of the plurality of ceramic layers are each independently of a ceramic material selected from the group consisting of $Al_2O_3$, SiC, AlN, $B_4C$, $ZrO_2$, Glass-Ceramics and $Si_3N_4$.

According to still further features in the described preferred embodiments the at least one metallic interlayer is selected from the group consisting of a metal and an alloy.

According to still further features in the described preferred embodiments the at least one metallic interlayer is of a metallic material selected from the group consisting of Ni, Al, Ti, Cu, Hf, Nb, Mo, Cr, Ta, Re, Rh and alloys thereof.

According to still further features in the described preferred embodiments the at least one metallic interlayer is of a brazing alloy.

According to still further features in the described preferred embodiments the brazing alloy is selected from the group consisting of CUSIL ABA (63% Ag, 35.25% Cu, 1.75% Ti), INCUSIL (59% Ag, 27.25% Cu, 12.5% In, 1.25% Ti), TICUSIL (68.8% Ag, 26.7% Cu, 4.5% Ti) and COPPER ABA (92.75% Cu, 3% Si, 2% Al, 2.25% Ti).

According to still further features in the described preferred embodiments the plurality of ceramic layers and the at least one metallic interlayer are layered by a bonding method selected from the group consisting of liquid state bonding, solid state bonding and transient liquid phase bonding.

According to still further features in the described preferred embodiments at least two of the plurality of ceramic layers are of a single ceramic material.

According to still further features in the described preferred embodiments at least two of the ceramic layers are of different ceramic materials.

According to still further features in the described preferred embodiments the at least one metallic interlayer includes a plurality of metallic interlayers.

According to still further features in the described preferred embodiments at least two of the plurality of metallic layers are of a single metallic material.

According to still further features in the described preferred embodiments at least two of the plurality of metallic layers are of different metallic materials.

According to still further features in the described preferred embodiments the at least one metallic layer is thinner that each of the plurality of ceramic layers.

The present invention successfully addresses the shortcomings of the presently known configurations by providing an article of manufacture or an article including same which is useful and superior in thermal shock involving applications.

BRIEF DESCRIPTION OF THE DRAWINGS

The invention is herein described, by way of example only, with reference to the accompanying drawings, wherein:

FIGS. 8a–d are SEM micrographs of the deformation mechanisms of the metallic interlayers across quenched (600° C.) laminate after applying a mechanical load: the second, closest to the quenches surface (a), the fourth (b) and the seventh (c) metallic interlayers, and a closed view on the microcracks generated at the tip of that crack (d).

DESCRIPTION OF THE PREFERRED EMBODIMENTS

Figure 1A:
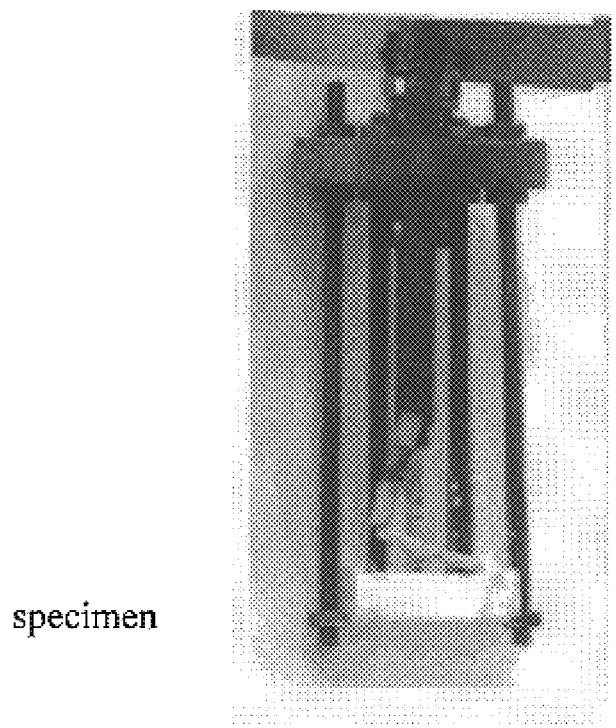
FIGS. 1a–b show a laminated specimen attached to a special stage (a), and a schematic closer look at the laminate at quenching (b).

The present invention is of a ceramic articles which have superior thermal shock induced crack formation resistance and which can therefore be used while implementing thermal shock involving applications.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided a laminate article of manufacture comprising a plurality of ceramic layers interposed by at least one metallic interlayer, such that a such that a ductile behavior with energy dissipating feature is obtained.

As used herein throughout the specification and in the claims section that follows, the phrase "a similar monolithic ceramic article" refers to a ceramic article which is made of the same ceramic material and has the same size and shape as the laminate article, yet does not include the metallic interlayers and is therefore monolithic.

According to yet another aspect of the present invention there is provided a laminate article of manufacture comprising a plurality of ceramic layers interposed by at least one metallic interlayer, such that a driving force in the laminate article is at least twice, preferably at least three fold, more preferably at least four fold, still preferably at least five to at least ten fold as much as compared with a similar monolithic ceramic article.

According to still another aspect of the present invention there is provided a laminate article of manufacture comprising a plurality of ceramic layers interposed by at least one metallic interlayer, such that a crack arrest mechanism is formed at ceramic-metal interfaces, thereby reducing crack formation when exposed to thermal shock, as compared to a similar monolithic ceramic article.

As used herein throughout the specification and in the claims section that follows, the phrase "thermal shock" refers to subjecting an article to a high temperature (say 500–1000° C.) which is somewhat below (say 0.5–200° C. below) the liquidus temperature of a metallic component therein and quenching the article or a surface thereof in a liquid, such as water, at room temperature.

According to an additional aspect of the present invention there is provided a laminate article of manufacture comprising a plurality of ceramic layers interposed by at least one metallic interlayer, such that substantially no interaction between cracking mechanisms developing in one ceramic layer with those in adjacent ceramic layers are evident upon thermal shock.

According to yet an additional aspect of the present invention there is provided a laminate article of manufacture comprising a plurality of ceramic layers interposed by at least one metallic interlayer, such that a cracking mechanism in each ceramic layer is substantially an independent event associated with a maximum tensile stresses in that layer.

According to still an additional aspect of the present invention there is provided a laminate article of manufacture comprising a plurality of ceramic layers interposed by at least one metallic interlayer, such that a residual load to fracture of the laminated article following a thermal shock is at least two fold, preferably at least three fold, more preferably at least four fold, still preferably at least five to at least ten fold higher as compared to a similar monolithic ceramic article.

According to a further aspect of the present invention there is provided an article of manufacture comprising a bulk ceramic or metal body being coated with a coat including a plurality of ceramic layers interposed by at least one metallic interlayer, such that a such that a ductile behavior with energy dissipating feature is obtained for the coat.

According to yet a further aspect of the present invention there is provided an article of manufacture comprising a bulk ceramic or metal body being coated with a coat including a plurality of ceramic layers interposed by at least one metallic interlayer, such that a crack arrest mechanism is formed at ceramic-metal interfaces, thereby reducing crack formation in the article when exposed to thermal shock, as compared to a similar monolithic ceramic article.

According to still a further aspect of the present invention there is provided an article of manufacture comprising a bulk ceramic or metal body being coated with a coat including a plurality of ceramic layers interposed by at least one metallic interlayer, such that substantially no interaction between cracking mechanisms developing in one ceramic layer with those in adjacent ceramic layers are evident upon thermal shock.

According to an additional aspect of the present invention there is provided an article of manufacture comprising a bulk ceramic or metal body being coated with a coat including a plurality of ceramic layers interposed by at least one metallic interlayer, such that a cracking mechanism in each ceramic layer is substantially an independent event associated with a maximum tensile stresses in that layer.

According to yet an additional aspect of the present invention there is provided an article of manufacture comprising a bulk ceramic or metal body being coated with a coat including a plurality of ceramic layers interposed by at least one metallic interlayer, such that a residual load to fracture of the article following a thermal shock is at least two fold, preferably at least three fold, to more preferably at least four fold, still preferably at least five to at least ten fold higher as compared to a similar monolithic ceramic article.

The bulk ceramic body (where applicable) and each of the plurality of the ceramic layers can each be any applicable ceramic material, such as, but not limited to, $Al_2O_3$, SiC, AlN, $B_4C$, $ZrO_2$, Glass-Ceramics and $Si_3N_4$. The metallic interlayer(s) can be either metal or alloy, such as, but not limited to, Ni, Al, Ti, Cu, Hf, Nb, Mo, Cr, Ta, Re, Rh and alloys thereof. According to a preferred embodiment the metallic interlayer(s) is of a brazing alloy, such as, but not limited to, CUSIL ABA (63% Ag, 35.25% Cu, 1.75% Ti), INCUSIL (59% Ag, 27.25% Cu, 12.5% In, 1.25% Ti), TICUSIL (68.8% Ag, 26.7% Cu, 4.5% Ti) and COPPER ABA (92.75% Cu, 3% Si, 2% Al, 2.25% Ti) and the like. Typically, all of the ceramic layers employed, e.g., 2–30 or more, preferably 3–20, more preferably, 4–10 layers, are of a single ceramic material, however, in other configurations two or more materials are selected. Composite materials in a single ceramic layer are also envisaged. Similarly, all of the metallic layers employed, e.g., 1–29 layers or more, , preferably 2–19, more preferably, 3–9 layers are of a single metallic material, however, in other configurations two or more materials are selected. Typically, the metallic layers are thinner, say at least two fold, preferably at least three fold, more preferably at least five fold, more preferably at least seven fold, more preferably at least nine fold, most preferably at least ten fold or more, as compared to the ceramic layers which are thicker. Thus, the thickness of each of the ceramic layers can, for example, range between 50–630 $\mu$m, preferably 75–500 $\mu$m, more preferably 100–300 $\mu$m, whereas the thickness of each of the metallic layers can, for example, range between 10–100, preferably between 15–75 $\mu$m, more preferably between 20 and 50 $\mu$m.

Several joining methods can be employed according to preferred embodiments of the present invention to join together the ceramic and metallic layers as herein described.

One method involves soldering and brazing which are a liquid state bonding method. Joining of a metal to a metal, a metal to a ceramic and a ceramic to a ceramic is performed in soldering or brazing using a filler or braze alloy. The materials to be joined and the joining metal are usually arranged together at room temperature, put under low pressure (less that 1 MPa). The materials are then heated to 10 to 15° C. above the liquidus of the soldering or brazing alloy (usually under vacuum or forming gas) and remain there for a short period (e.g., 5–20 minutes, typically about 10 minutes). No special surface treatment is required aside of cleaning the surfaces. Thickness of the brazed alloy may range from about 25 $\mu$m and above.

Another method involved diffusion bonding which is a solid state bonding. In this case there is no need for additional joining materials. The two materials to be bonded need to have high quality surface treatment with low roughness. The two materials are usually heated to a temperature above 0.5 the melting point, put under considerable pressure (hundreds of MPa) for a long time period, typically of several hours. The bonding is by diffusion of atoms of both materials to each other. A controlled atmosphere is required in diffusion bonding.

Still another method involves transient liquid phase, which is a combined method. The joining of metal and ceramic using a thin interlayer of metal, which compensates possible roughness between the metal and the ceramics. The bonding temperature is above the melting point of the metal. The actual joining is obtained by diffusion bonding.

Thus, according to the present invention a new material system for applications involving thermal shock is provided.

The system includes thin layers of ceramics and typically thinner metallic interlayers. In the Examples section that follows, and while reducing the present invention to practice, a ceramic/metal laminate was constructed from Coor's ADS96R thin plates alternating with thinner Wesgo CUSIL ABA interlayer foils and joined in active brazing. The maximum brazing temperature was 845° C. in this case. Square shaped laminated plates were quenched in room temperature distilled water, where very large heat transfer coefficient exists, and therefore the most severe conditions of thermal shock occur. The laminated plates, initially at temperatures of 600° C. and 800° C., where quenched at their bottom surface only using a specially designed apparatus. The temperatures at the top and the bottom surfaces of the specimens were measured by means of two thermocouples during quenching. The dominant behavior was the absence of interaction between the biaxial cracking mechanisms in an individual layer, and localization of the damage to those layers experienced sufficient tensile stresses. The result was a dramatic increase of the residual strength after thermal shock. In addition, R-curve behavior upon mechanical loading due to plastic deformation of the metallic interlayer was observed. The cracking density in an individual layer is decreased as the distance of that layer from the quenched surface is increased. Another important feature of the laminated system is its ability to combine more than two materials in order to reduce the thermal stresses, which improves the survivability of the material under severe thermal shock conditions.

The ceramic articles of the present invention may find uses and show superior qualities in thermal shock involving applications. Such applications include, but are not limited to, after burner flaps, skins for space shuttles, jet engine ducts, incinerator walls, breaks, cylinder coatings.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion. Examples 1–3 below relate to the experimental set up, whereas Examples 4–7 below relate to the experimental results.

Example 1

Constituents and Laminate

The ceramic constituent employed while reducing the present invention to practice was Coor's ADS96R nominally 370 mm thick alumina plates, the metallic constituent—thin Wesgo CUSIL ABA (63 wt % Ag, 1.75 Ti, and bal. Cu.) sheets. The liquidus of the brazed alloy is 780° C., the solidus 815° C. The alumina layers and metallic interlayers were joined by brazing, a low cost and simple processing route (viz. relatively low temperature, pressure, and time requirements). No special surface treatment was used, aside from cleaning the materials in an ultrasonic acetone bath. The specimens were put under low pressure (0.15 MPa), applied by a solid fixture at room temperature. Brazing was carried out under vacuum of $10^{-5}$ Torr, at a maximum temperature of 845° C., held for 10 minutes to achieve good bonding. The brazing process of the current system has lately been extensively studied [22–25] and was shown to have the brittle product layers generated during processing. The laminates for thermal shock testing in this investigation were constructed from 9 alumina layers and 8 metallic interlayers, the total thickness was 3.6 mm, and the specimens were square shaped with a gage area of 25×25 mm².

In an attempt to verify the ability of the laminate to serve as a protective skin, or alternatively, to explore the possibility of reducing the number of metallic interlayers, thick alumina plates were 'coated' by (i) two thin alumina plates alternated with two metallic interlayers, and (ii) four alumina plates and four metallic interlayers. The thicknesses and compositions of the alumina and the metallic interlayers, as well as the processing conditions were the same as described above.

To gain some insight into the thermal shock behavior of alumina, monolithic specimens were investigated by testing them under pertinent conditions, and the critical temperature difference was more rigorously defined and measured. The thickness of the alumina specimens ranged from 0.5 mm to 6 mm, in order to obtain the variation of the temperature difference as a function of the thickness.

Example 2

Thermal Shock Conditions

A special apparatus for thermal shock testing was designed and built. It includes an open furnace, a special stage which kept the specimen horizontal during quenching (FIG. 1a), and a piston pushing the specimens towards a small container of distilled water such that only the bottom surface of the specimen experienced the thermal shock. Two thermocouples, measuring the temperatures of the top and the bottom surfaces of the specimens (FIG. 1b) at a rate of 17 Hz, were connected to a PC for data recording. The thermocouples were k-type, 0.15 mm in diameter. The tip of each thermocouple was ground to a hemispherical shape and attached to the specimen using Cerambond® cement. The total volume of the cement and the tip did not exceed 2 mm³, to minimize any influence on the temperature measurements.

Figure 1B:
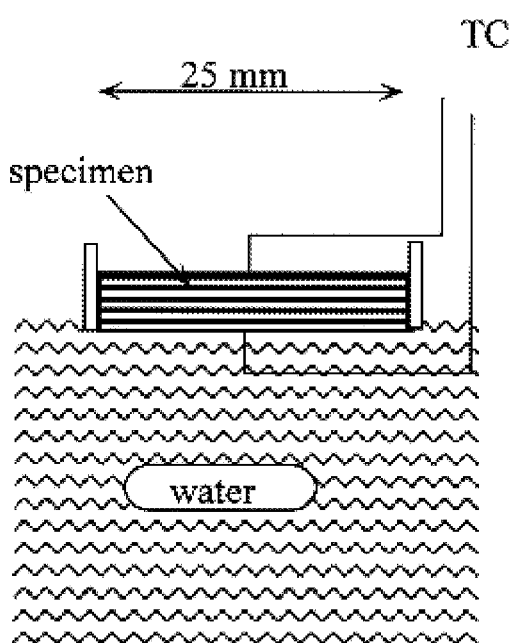

Laminated specimens were quenched in water, from initial temperatures of 600° C. (below solidus) and 800° C. (above solidus). To avoid cooling of the top surface of the specimens due to turbulence of the water during quenching, and to prevent irrelevant cracking at the specimen's edges, four thin alumina plates were bonded to the specimen's edges by Cerambon® (FIG. 1b). This ensured that the quenched specimens could as closely as possible be considered as an infinite plate. The limited strength of the bond, the porosity in it, and the low amount of bond that was used prevented any significant constraint of the tested specimens.

The reason for keeping the specimens horizontal during quenching was to enable the experimental conditions to be described as a boundary value problem and thus to obtain accurate analytical and computer simulations.

Example 3

Evaluation of the Laminate After Thermal Shock

After quenching, the laminated plates were cut to form bending beams and were tested under three (3PB) and four (4PB) point bending (span of 20 mm). The beam width was kept to 3.5 mm. Quenched specimens and those that were also mechanically loaded were analyzed by HRSEM. A penetrating die was used to mark the cracks in a damaged surface.

Example 4

Monolithic Alumina Under Thermal Shock

Figure 2:
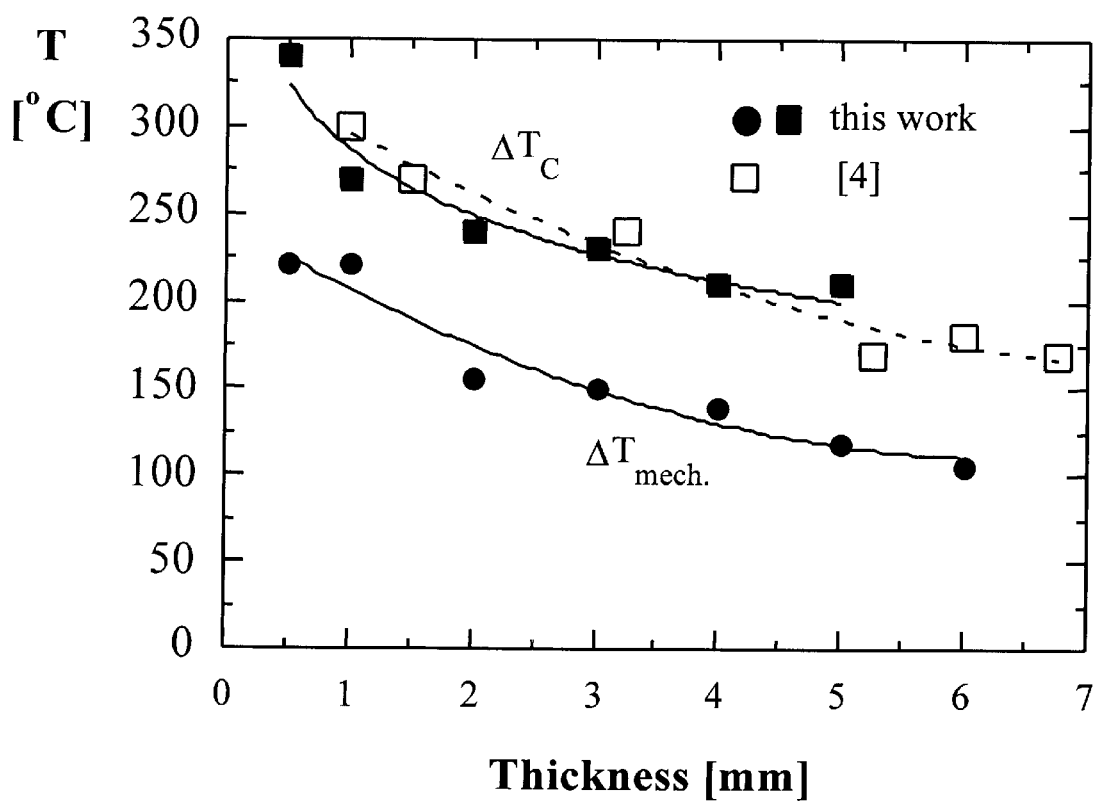
FIG. 2. is a graph demonstrating the maximum difference in temperature prior to cracking as a function of specimen thickness for monolithic alumina. The closed symbols refer to $\Delta T_C$ and $\Delta T_{mech}$ of the laminate of the present invention, the open symbols were adopted from [4] and they refer to $\Delta T_C$.
Figure 3A:
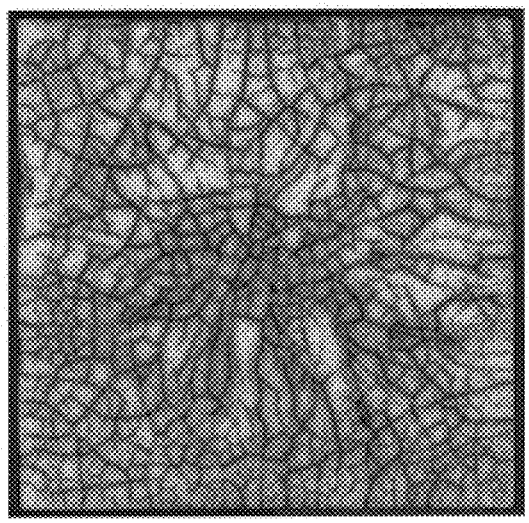
FIGS. 3a–c are photographs demonstrating the biaxial cracking mechanisms in a 3.6 mm thick monolithic alumina plate: the cracking at the quenched surface (a), the unquenched surface (b), and a cross section of the specimen (c), revealing the depth of the cracks. Note the major and the minor cracks.
Figure 3B:
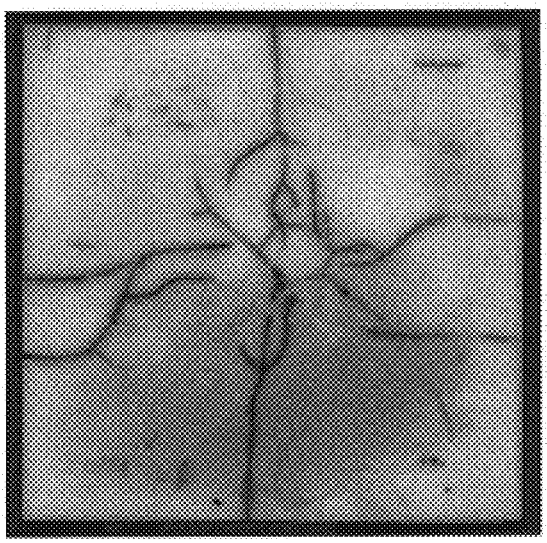
Figure 3C:
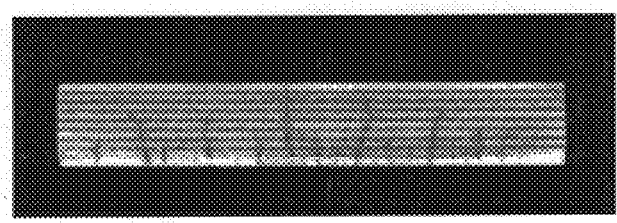

The in-situ temperature measurements were an opportunity to examine the classical approach, which defines $\Delta T_C$ as the critical temperature prior to cracking (see above). A more rigorous parameter, $\Delta T_{mech}$, is defined herein as the maximum difference in temperatures between the quenched surface and the top surface that a specimen can experienced prior to cracking. Both measured parameters are shown in FIG. 2, as a function of specimen thickness. It is postulated that $\Delta T_{mech}$ provides the mechanical loads, and hence is the driving force for cracking. Analysis of the thickness effect was extensively studied and discussed elsewhere [26]. A photograph of the quenched and the unquenched surfaces of a 3.6 mm thick alumina specimen quenched from 600° C. are shown in FIGS. 3a and 3b, respectively. A cross section of this specimen is shown in FIG. 3c. Two types of cracks were observed: minor cracks, resulting from the in-plane tensile biaxial stress, initiated at the bottom surface of the specimen, and major cracks, initiated at the edges of the specimen despite the protection provided against this occurrence.

Example 5

The Mechanical Behavior of the Laminate

The residual stresses after brazing are difficult to analyze when constrained thin layers are involved. Based on the linear elastic behavior of the metallic interlayer during cooling down, and using the mechanical and thermal properties shown in Table 1 below, the room temperature residual stresses in the alumina layers and in the metallic interlayers were calculated to be 72.4 MPa compressive and 886 MPa tensile, respectively. These results set the uppers bound for the stresses, since limited stress relaxation due to dislocation movement in constrained layers is expected.[27] The calculated tensile stresses in the metallic interlayers were about 3 times the tensile strength, resulting from the high hydrostatic stresses within these constrained layers. The load-deflection curve of the laminate under 3PB exhibit brittle behavior with no energy dissipating feature.

TABLE 1

| | E GPa | ν — | $\sigma_Y$ MPa | $\sigma_{UTS}$ MPa | $\epsilon_{UTS}$ % | α °C.$^{-1}$ | k W/ (m · C) | ρ g/cm³ |
|---|---|---|---|---|---|---|---|---|
| ADS96R | 320 | 0.21 | 320 (16)* | — | — | 8.3 | 22 | 3.9 |
| CUSIL ABA† | 83 | — | 271 | 346 | 20 | 18.5 | 180 | 9.8 |

Constituents of the ceramic/metal laminate and their mechanical and thermal properties.
†Wesgo data sheet, www.wesgometals.com, 1998.
*Median Strength and Weibull Modulus, D. Sherman, Unpublished results.

Example 6

Mechanical Behavior of the Laminate Under Thermal Shock

Figure 4:
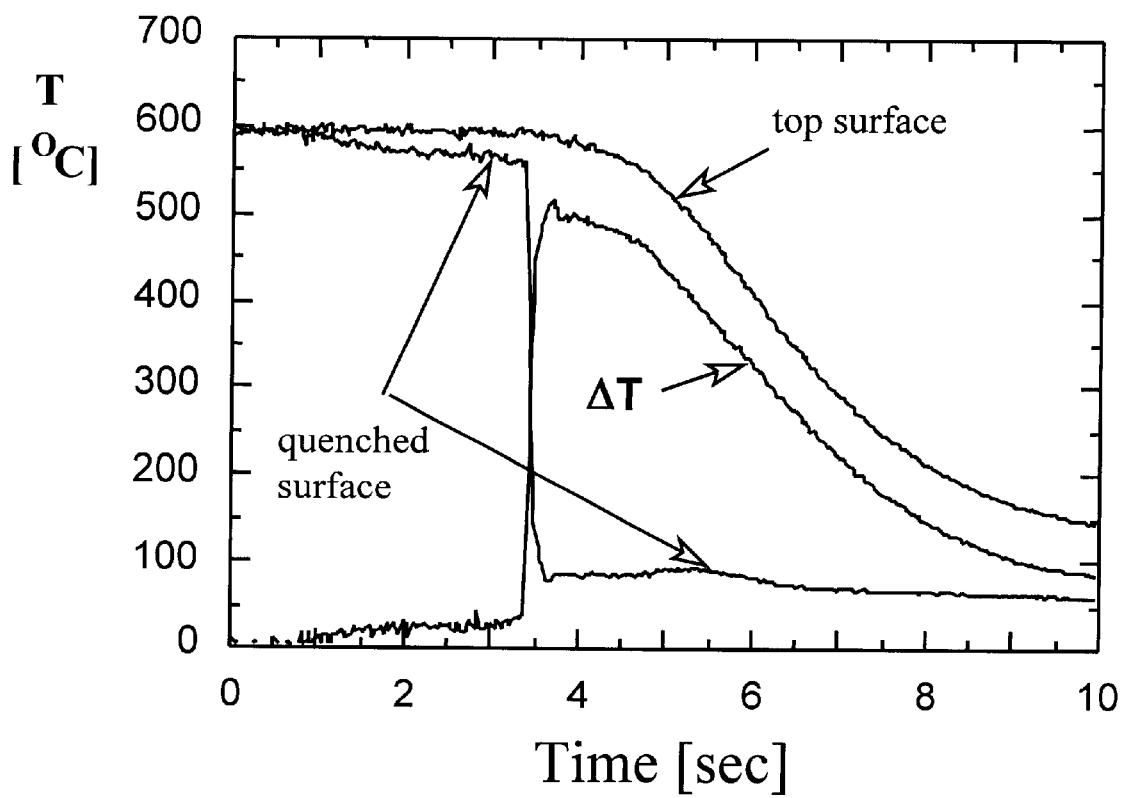
FIG. 4 is a graph demonstrating the temperature-time relationship at the top and the bottom of alumina/CUSIL ABA laminate quenched from 600° C., and $\Delta T_{mech}$, the differences between these temperatures.

Typical temperature-time relationship at the top and at the bottom surfaces of a laminate quenched from an initial temperature of 600° C., and the differences between these temperatures (designated $\Delta T_{mech}$) are shown in FIG. 4. The maximum temperature difference is seen to be 520° C., four times the maximum temperature difference prior to cracking (130° C.) for monolithic alumina of similar thickness, as shown in FIG. 2. Alternatively, the driving force in the laminate is approximately four times the driving force needed to initiate damage in monolithic alumina. The plateau temperature at the bottom surface of the laminate fluctuates around 90° C. and is the result of the heat transfer from the specimen to the contiguous water, which causes it nearly to reach to the boiling point.

Figure 5A:
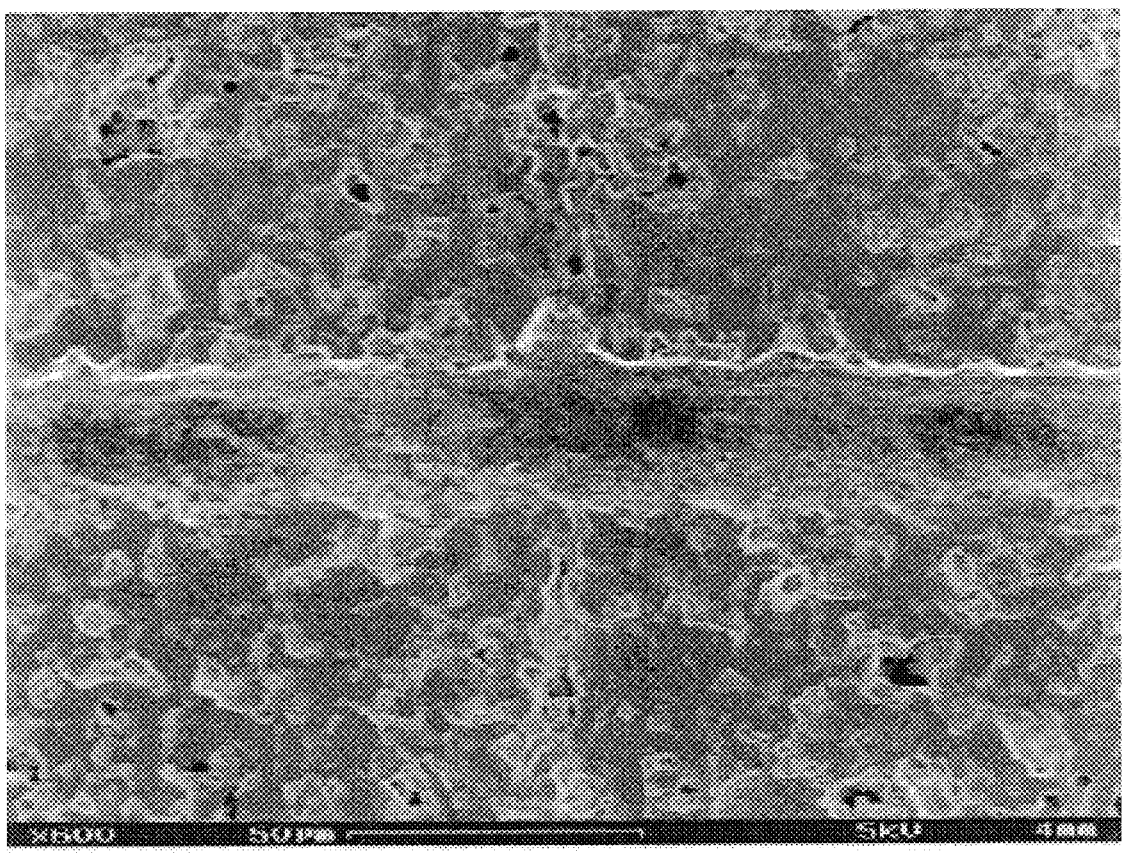
FIGS. 5a–c are SEM micrographs of the cracked alumina layers in a laminated specimen quenched from 600° C. (a), higher magnification of the interfaces between the alumina and the brazed alloy (b), and the microcracking mechanism in metallic interlayer/product layer interface at the vicinity of the crack (c).
Figure 5B:
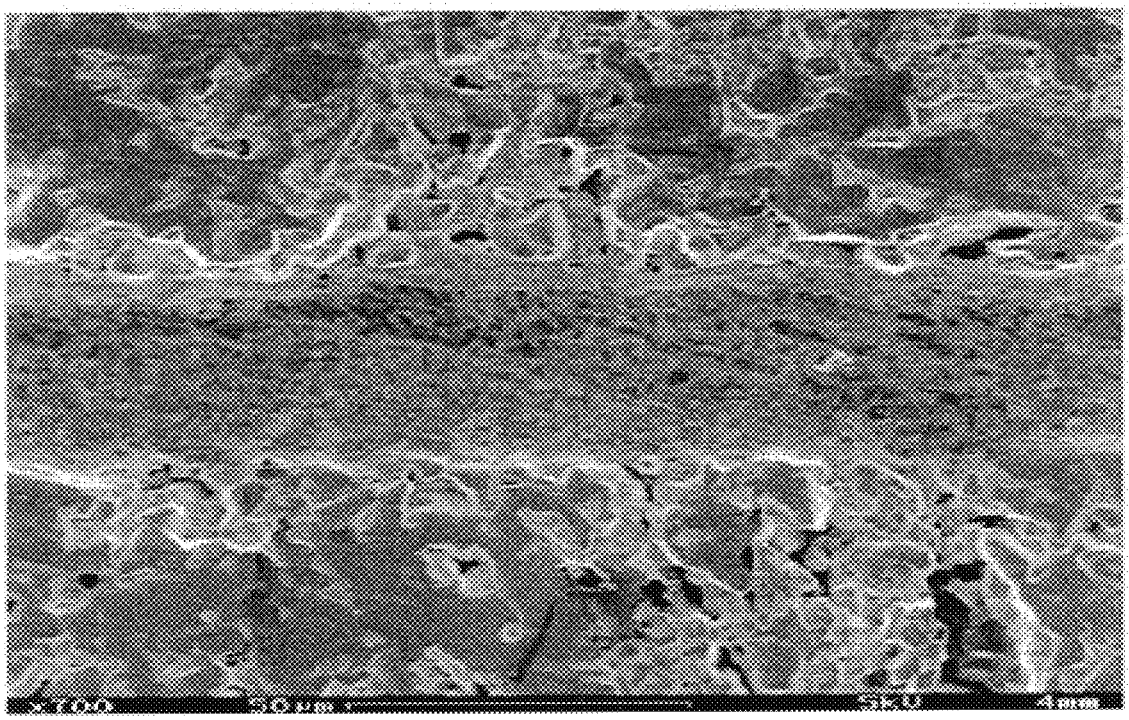
Figure 5C:
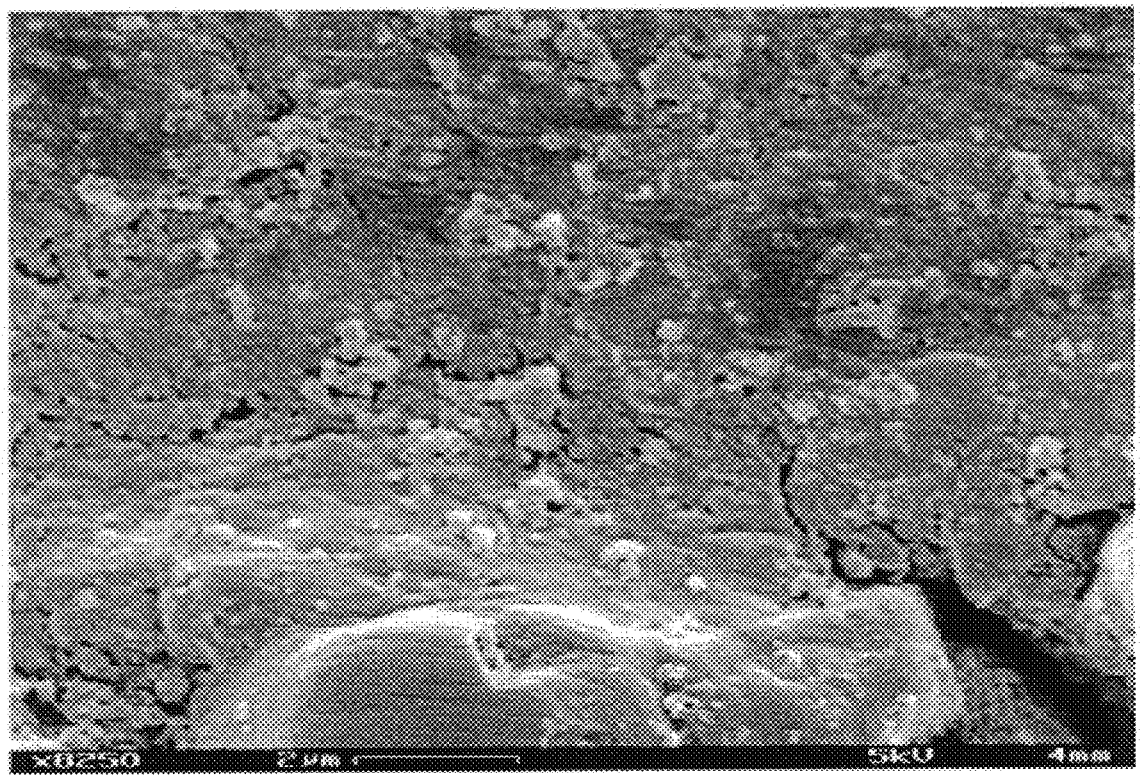

As further described below, a typical network of cracks was seen in the outer alumina layer after thermal shock. However, the compressive stresses in the alumina layers made a complete identification of the cracks difficult, by either optical photographs or microscopic ones. Examples of HRSEM micrographs demonstrate the crack arrest mechanism at the alumina/metal interface, FIGS. 5a and 5b. Higher magnification of FIG. 5b at the vicinity of the ceramic/metal interface revealed a limited crack deflection and microcracks at the interface between the metallic interlayers and the product layers were observed, FIG. 5c, rather than at the interface between the product layers and the alumina layers. No interaction between the cracking mechanisms in a ceramic layer with those in an adjacent ceramic layer was evident, which indicated that the cracking mechanisms in each ceramic layer is an independent event associated with the maximum tensile stresses in that layer. If the tensile stresses in a layer are lower than the ultimate tensile stresses of the layer, it remains completely undamaged. The statistical nature of the strength of ceramics, by means of Weibull Statistics should be taken into account when a rigorous analysis of the behavior is to be considered.

Figure 6A:
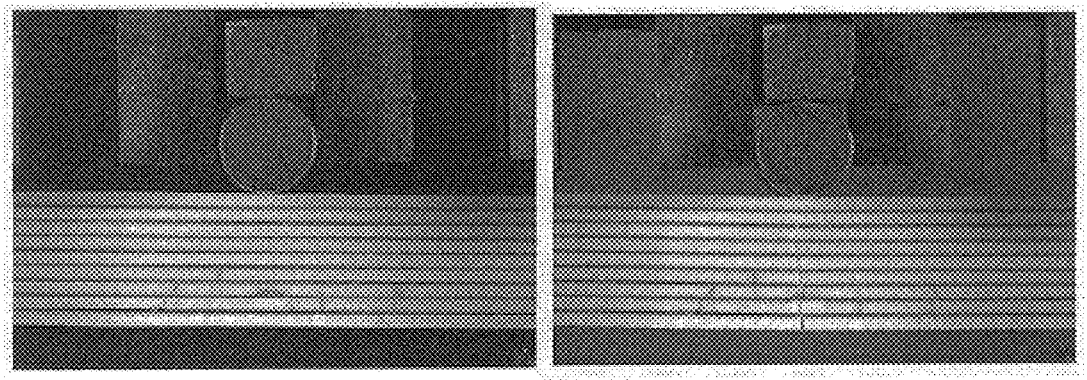
FIGS. 6a–b are photographs of laminated beams, cut from a laminated specimen that was quenched from 600° C. under 3PB (a) and 4PB (b) before (left) and after (right) applying the mechanical loading.
Figure 6B:
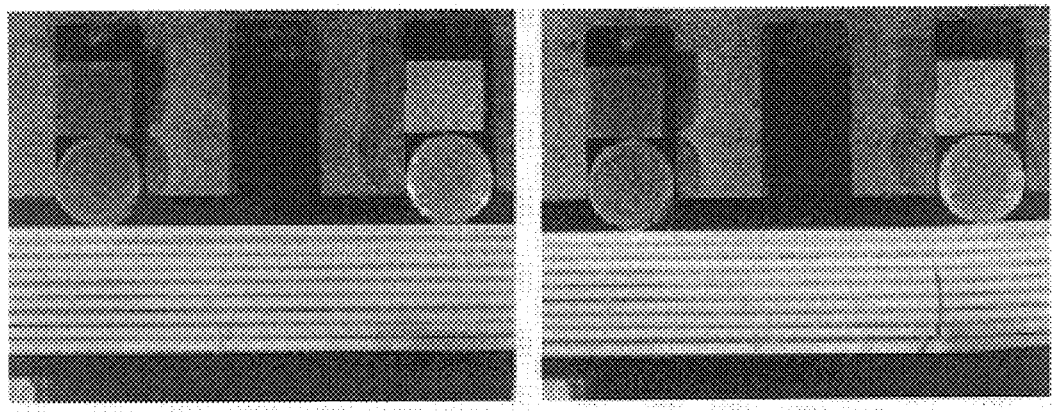

Photographs of a bending beam cut from a quenched specimen under three and four point bending before and after mechanical loading are shown in FIGS. 6a and 6b, respectively. The crack advance does not necessarily coincide with the cracks being generated during the thermal shock, but it follows the maximum $K_I$ direction. Four cracked layers were identified in the bending beams cut from the quenched laminated plate using die penetrant.

Figure 7A:
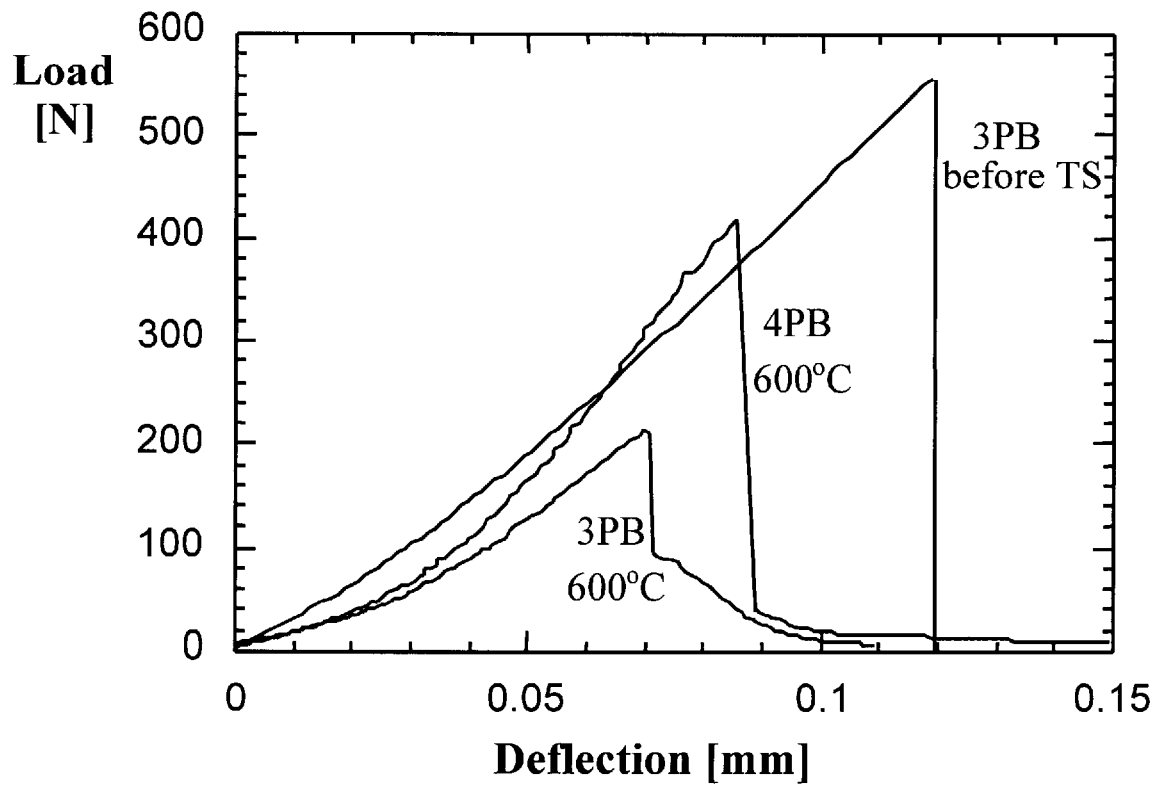
FIGS. 7a–c are graphs demonstrating the load vs. load point deflection curves of an unquenched laminated beam, loaded under 3PB, and of a laminated beam cut from quenched plate from 600° C. under 3 and 4PB (a), of a similar monolithic alumina beam quenched in same conditions (b), and of a beam cut from a laminate specimen quenched from 800° C. (c).
Figure 7B:
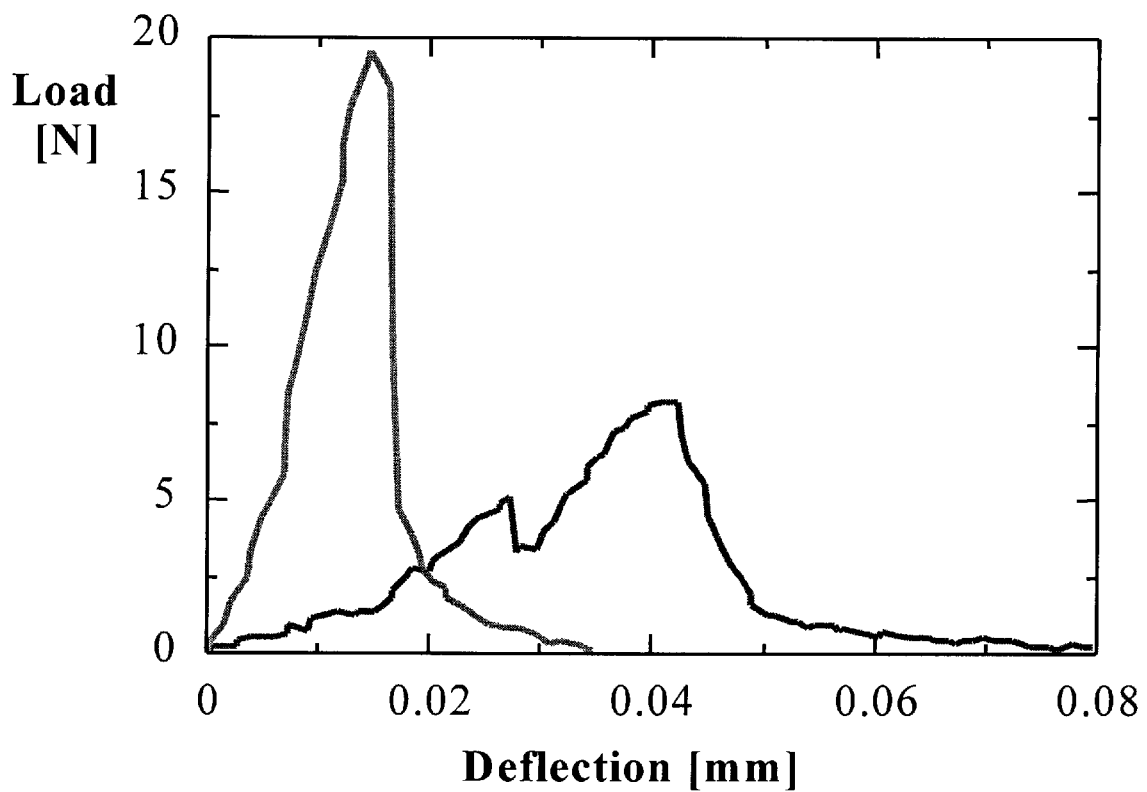

Mechanical tests of the beams before and after quenching showed the following:

The load to fracture measured for the unquenched laminate was 460 N. The 3PB and 4PB loads to fracture of similar beams cut from a laminated specimen quenched from 600° C. were 210 and 419 N, respectively (FIG. 7a). The typical residual loads (the load carrying capacity of the cracked specimen) of similar, monolithic alumina beams after thermal shock under the same conditions were less than 20 and 10 N (FIG. 7b), the first associated with the propagation of a minor crack, the latter with the propagation of a major crack (FIG. 3b).

These results demonstrate the dramatic increase of the residual load to fracture of the laminate. Furthermore, the quenched laminate exhibited R-curve behavior, while the pristine laminate was deformed in a completely brittle manner.

Figure 7C:
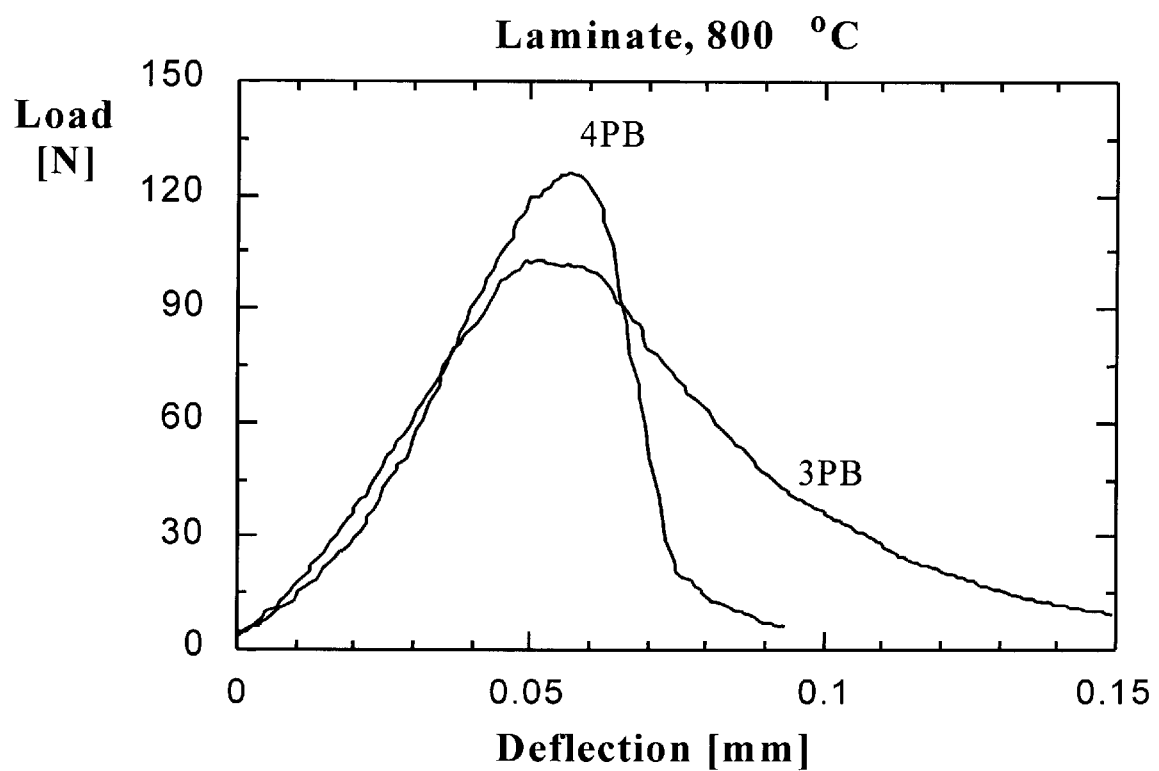

In order to understand the effect of thermal shock on the residual load of the laminate, and on the metallic interlayers in particular, the same procedure was carried out after quenching a laminated specimen from 800° C., a temperature above the solidus of the metallic interlayers. The load vs. point load deflection curves of a beam cut from laminated specimen, loaded in 3PB and 4PB are shown in FIG. 7c. The reduced maximum load is attributed to the increased temperature difference that caused higher thermal stresses, and therefore cracks in larger number of alumina layers. The R-curve behavior in this case is more pronounced, presumably because more metallic interlayers were fully deformed. In these specimens, five damaged were identified using die penetrant.

Figure 9A:
FIGS. 9a–b are SEM micrographs of microcracks in a metallic interlayer just ahead of the plastic zone at the vicinity of the major crack (a), and higher magnification (b).
Figure 9B:
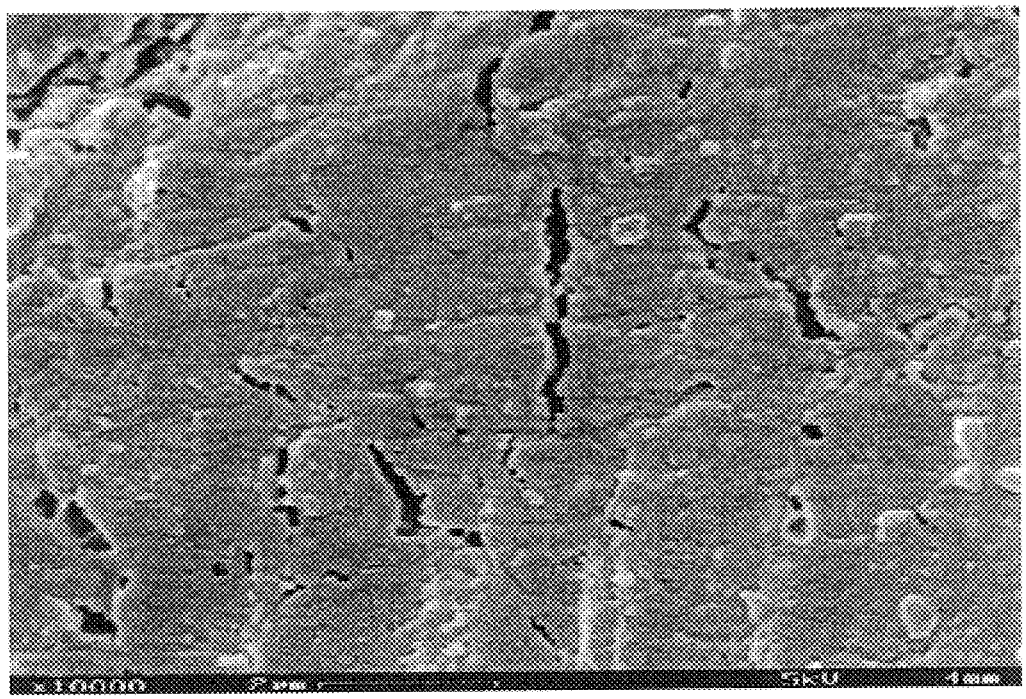
Figure 10A:
FIGS. 10a–d are photographs demonstrating crack density at the quenched (a), the third (b) and the fourth (c) alumina thin layers, and that observed in a bulk alumina plate (d).
Figure 10B:
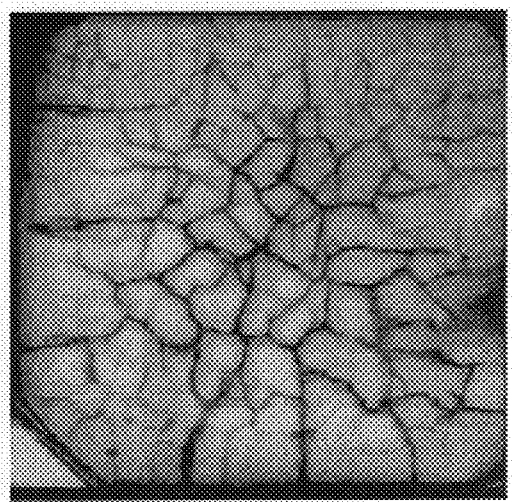
Figure 10C:
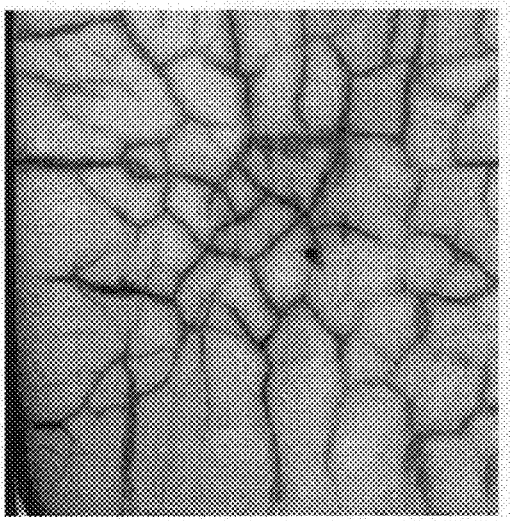
Figure 10D:
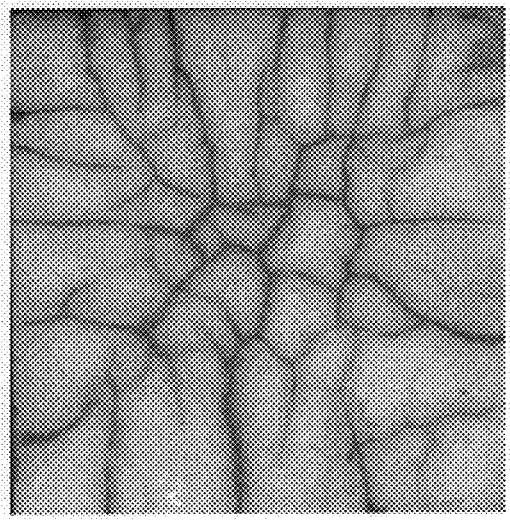

An HRSEM analysis of the deformation mechanisms of the metallic interlayers of a laminate which was quenched from 600° C. is shown in FIGS. 8a–d. The first micrographs (FIG. 8a) is of the second (from the quenched surface) metallic interlayer, and reveals the plastic deformation after a large crack opening. The subsequent micrographs, FIGS. 8b and 8c, represent the evolution of the deformation in the fourth and the seventh metallic interlayers. The strong interface is evident in all these Figures. Microcracking at the highly strained and constrained metallic interlayers were observed, FIG. 8d. Another important observation is that although high plastic deformation is evident in the metallic interlayers at the vicinity of the major crack, microcracks just ahead of the plastic zone are clearly visible, FIGS. 9a and 9b, which are a magnification of the plastic zone shown in FIG. 8b. It is postulated that these microcracks are the results of the additional tensile stresses generated during mechanical loading of highly strained, constrained thin layers. The R-curve behavior under mechanical loading obtained in quenched laminates was the result of the increased volume of the metallic interlayers subjected to plastic deformation due to the small crack deflection of cracks at the metal interlayers/product layer interface, FIGS. 8a–d.

Example 7

Thermal Shock of a Laminate as a Protective Coating

The bulk alumina plates that were 'coated' with the two types of alumina/metal laminate were quenched from 600° C. In both types, the alumina layers and the bulk plates were fractured. The biaxial cracking mechanisms in the first, third, and the fourth layers, and that in the bulk alumina plate are shown in FIGS. 10a–d, respectively. It is shown that the cracking density decreased from layer to layer, and that the damage to the bulk plate was dropped as compared with that observed in the monolithic alumina, FIG. 3a.

Two important conclusions may arise from these results: (i) the concept of using laminate as a coating for bulk alumina plates should be following a rigorous design, such that at least the bulk alumina plate will experience no damage; and (ii) increasing the thickness of a specimen in order to increase its residual strength may be a misconception because of the increased bending rigidity of the specimen. In this case, the bending stresses that cause a reduction in the tensile stresses may drastically reduced [26].

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications cited herein are incorporated by reference in their entirety.

REFERENCES

1. D. P. H. Hasselman, J. Am. Ceram. Soc. 52,600 (1955).
2. Zhi-He Jin and Y. W. Mai, J. Am. Ceram. Soc. 78, 1873 (1995).

3. N. Claussen and D. P. H. Hasselman, in Thermal Stresses in Severe Environments, D. P. H. Hasselman and R. A. Heller (eds), Plenum Publishing Corp., p. 381 (1980).
4. P. F. Becher and W. H. Warwick, NATO ASI Series, Series E: Applied Sci.——Vol. 241, G. A. Schneider and G. Petzow (edts.), Kluwer Academic Publishers, p 37 (1993).
5. W. D. Kingery, J. Am. Ceram. Soc., 38,3 (1955).
6. H. Wang and R. N. Singh, Int. Materials Review, 39, 6 (1994)
7. P. F. Becher, Communication of the Am. Ceram. Soc., 1, C-17 (1981).
8. K. Upadhya et. al., J. Am. Ceram. Soc. Bul. , p 51, (December 1997).
9. O. B. Boggild, Kong. Dansk. Vidensk. Selskabs Skrifter., 9,235 (1930).
10. J. D. Currey, Proc. Roy. Soc. B196, 443 (1977).
11. D. Sherman, J. Lemaitre and F. A. Leckie, Acta Metall. 43, 3261 (1995).
12. D. Sherman, J. Lemaitre and F. A. Leckie, Acta Metall. 43,4483 (1995).
13. W. A. Cutler, F. W. Zok and F. F. Lange, J. Am. Ceram. Soc. 79, 1825 (1996).
14. W. J. Clegg, K. Kendall, N. M. Alford, D. Birchall and T. W. Button, Nature 347, 455 (1990).
15. W. J. Clegg, Acta. Metall. Mater. 40, 3093 (1992).
16. L. Zhang and V. D. Krstic, Theo. and App. Frac. Mech. 24, 13 (1995).
17. D. B. Marshall, J. J. Ratto and F. F. Lange, J. Am. Ceram. Soc. 74, 2979 (1991).
18. A. G. Evans, A. Bartlett, J. B. Davis, B. D. Flinn, M. Turner and I. E. Reimanis, Scripta Met. et Mater. 25, 1003 (1991).
19. T. S. Oh, J. Rodel, R. M. Cannon and R. O. Ritchie, Acta Met. 36, 2083 (1988).
20. I. E. Reimanis, B. J. Dalgleish and A. G. Evans, Acta. Metall. 39, 3133 (1991).
21. A. Schussler and K.-H. Z. Gahr, J. de Physique IV, 1, C7–121 (1991).
22. C. H. Cho and Jin Yu, Scripta Met., 26, 1737 (1990).
23. M. Naka, K. Sahpath, I. Okamoto and Y. Arata, Mat. Sci. and Eng., 98, 407 (1988).
24. M. Naka, K. Kim, I Okamoto, Trans. of JWRI 13, 157 (1984).
25. D. Sherman, Materials Letters, 33, 255 (1998).
26. D. Sherman and D. Schlumm, Submittd (1998).
27. A. G. Evans and J. W. Hutchinson, Acta Metall. mater. 43, 2507 (1995).

What is claimed is:

1. A laminate article of manufacture comprising a plurality of ceramic layers interposed by at least one metallic interlayer, such that a ductile behavior with energy dissipating feature is obtained, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

2. A laminate article of manufacture comprising a plurality of ceramic layers interposed by at least one metallic interlayer, such that a driving force for cracking in the laminate article is at least twice as much as compared with a similar monolithic ceramic article, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

3. A laminate article of manufacture comprising a plurality of ceramic layers interposed by at least one metallic interlayer, such that a crack arrest mechanism is formed at ceramic-metal interfaces, thereby reducing crack formation when exposed to thermal shock, as compared to a similar monolithic ceramic article, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

4. A laminate article of manufacture comprising a plurality of ceramic layers interposed by at least one metallic interlayer, such that substantially no interaction between cracking mechanisms developing in one ceramic layer with those in adjacent ceramic layers are evident upon thermal shock, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

5. A laminate article of manufacture comprising a plurality of ceramic layers interposed by at least one metallic interlayer, such that a cracking mechanism in each ceramic layer is substantially an independent event associated with a maximum tensile stresses in that layer, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

6. A laminate article of manufacture comprising a plurality of ceramic layers interposed by at least one metallic interlayer, such that a residual load to fracture of the laminated article following a thermal shock is at least two fold higher as compared to a similar monolithic ceramic article, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

7. The laminate article of manufacture of claim 1, wherein each of said plurality of ceramic layers is independently of a ceramic material selected from the group consisting of $Al_2O_3$, SiC, AlN, $B_4C$, $ZrO_2$, Glass-Ceramics and $Si_3N_4$.

8. The laminate article of manufacture of claim 1, wherein said at least one metallic interlayer is selected from the group consisting of a metal and an alloy.

9. The laminate article of manufacture of claim 1, wherein said at least one metallic interlayer is of a metallic material selected from the group consisting of Ni, Al, Ti, Cu, Hf, Nb, Mo, Cr, Ta, Re, Rh and alloys thereof.

10. The laminate article of manufacture of claim 1, wherein said at least one metallic interlayer is of a brazing alloy.

11. The laminate article of manufacture of claim 10, wherein said brazing alloy is selected from the group consisting of (i) 63% Ag, 35.25% Cu, 1.75% Ti, (ii) 59% Ag, 27.25% Cu, 12.5% In, 1.25% Ti, (iii) 68.8% Ag, 26.7% Cu, 4.5% Ti and (iv) 92.75% Cu, 3% Si, 2% Al, 2.25% Ti.

12. The laminate article of manufacture of claim 1, wherein said plurality of ceramic layers and said at least one metallic interlayer are layered by a bonding method selected from the group consisting of liquid state bonding solid state bonding and transient liquid phase bonding.

13. The laminate article of manufacture of claim 1, wherein at least two of said plurality of ceramic layers are of a single ceramic material.

14. The laminate article of manufacture of claim 1, wherein at least two of said ceramic layers are of different ceramic materials.

15. The laminate article of manufacture of claim 1, wherein said at least one metallic interlayer includes a plurality of metallic interlayers.

16. The laminate article of manufacture of claim 15, wherein at least two of said plurality of metallic layers are of a single metallic material.

17. The laminate article of manufacture of claim 15, wherein at least two of said plurality of metallic layers are of different metallic materials.

18. An article of manufacture comprising a bulk ceramic or metal body being coated with a coat including a plurality of ceramic layers interposed by at least one metallic interlayer, such that a ductile behavior with energy dissipating feature is obtained for said coat, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

19. An article of manufacture comprising a bulk ceramic or metal body being coated with a coat including a plurality of ceramic layers interposed by at least one metallic interlayer, such that a crack arrest mechanism is formed at ceramic-metal interfaces, thereby reducing crack formation in the article when exposed to thermal shock, as compared to a similar monolithic ceramic article, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

20. An article of manufacture comprising a bulk ceramic or metal body being coated with a coat including a plurality of ceramic layers interposed by at least one metallic interlayer, such that substantially no interaction between cracking mechanisms developing in one ceramic layer with those in adjacent ceramic layers are evident upon thermal shock, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

21. An article of manufacture comprising a bulk ceramic or metal body being coated with a coat including a plurality of ceramic layers interposed by at least one metallic interlayer, such that a cracking mechanism in each ceramic layer is substantially an independent event associated with a maximum tensile stresses in that layer, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

22. An article of manufacture comprising a bulk ceramic or metal body being coated with a coat including a plurality of ceramic layers interposed by at least one metallic interlayer, such that a residual load to fracture of the article following a thermal shock is at least two fold higher as compared to a similar monolithic ceramic article, wherein each of said ceramic layers has a thickness between 50 micrometers and 630 micrometers and further wherein each of said at least one metallic interlayer has a thickness between 10 micrometers and 100 micrometers, with the provision that a thickness of a certain metallic interlayer of said at least one metallic interlayer is less than a thickness of ceramic layers of said plurality of ceramic layers adjacent thereto.

23. The article of manufacture of claim 18, wherein said ceramic body and each of said plurality of ceramic layers are each independently of a ceramic material selected from the group consisting of $Al_2O_3$, SiC, AlN, $B_4C$, $ZrO_2$, Glass-Ceramics and $Si_3N_4$.

24. The article of manufacture of claim 18, wherein said at least one metallic interlayer is selected from the group consisting of a metal and an alloy.

25. The article of manufacture of claim 18, wherein said at least one metallic interlayer is of a metallic material selected from the group consisting of Ni, Al, Ti, Cu, Hf, Nb, Mo, Cr, Ta, Re, Rh, and alloys thereof.

26. The article of manufacture of claim 18, wherein said at least one metallic interlayer is of a brazing alloy.

27. The article of manufacture of claim 26, wherein said brazing alloy is selected from the group consisting of (i) 63% Ag, 35.25% Cu, 1.75% Ti, (ii) 59% Ag, 27.25% Cu, 12.5% In, 1.25% Ti, (iii) 68.8% Ag, 26.7% Cu, 4.5% Ti and (iv) 92.75% Cu, 3% Si, 2% Al, 2.25% Ti.

28. The article of manufacture of claim 18, wherein said plurality of ceramic layers and said at least one metallic interlayer are layered by a bonding method selected from the group consisting of liquid state bonding, solid state bonding and transient liquid phase bonding.

29. The article of manufacture of claim 18, wherein at least two of said plurality of ceramic layers are of a single ceramic material.

30. The article of manufacture of claim 18, wherein at least two of said ceramic layers are of different ceramic materials.

31. The article of manufacture of claim 18, wherein said at least one metallic interlayer includes a plurality of metallic interlayers.

32. The article of manufacture of claim 25, wherein at least two of said plurality of metallic layers are of a single metallic material.

33. The article of manufacture of claim 31, wherein at least two of said plurality of metallic layers are of different metallic materials.

* * * * *